Dec. 31, 1935.  A. A. GOERZ  2,026,228
SPRING CONSTRUCTION
Filed Aug. 31, 1934
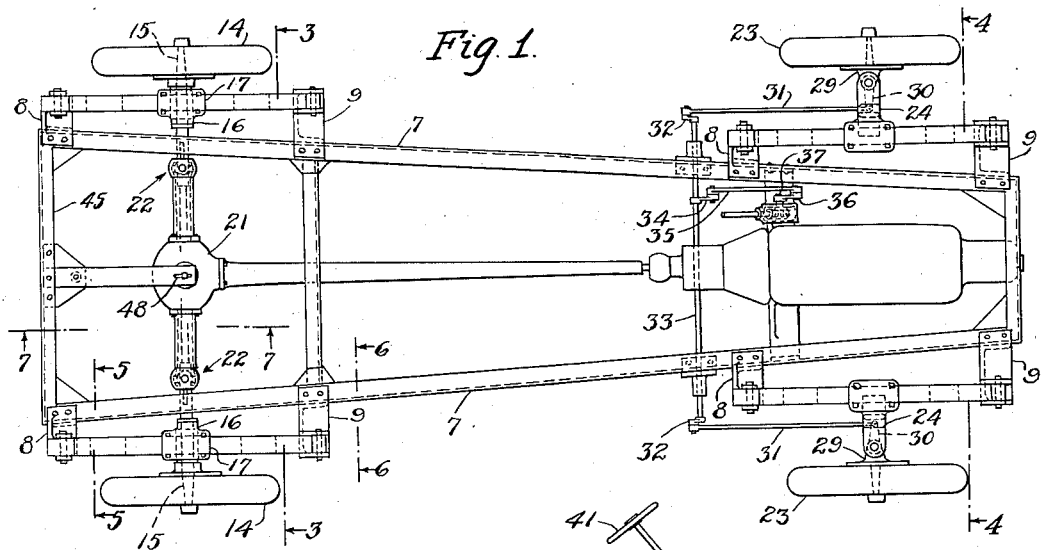
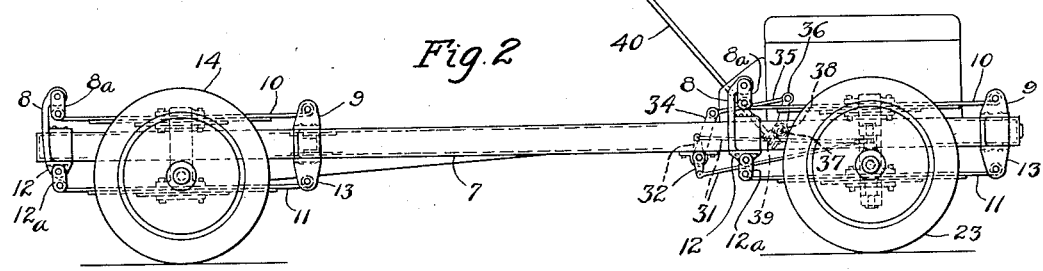
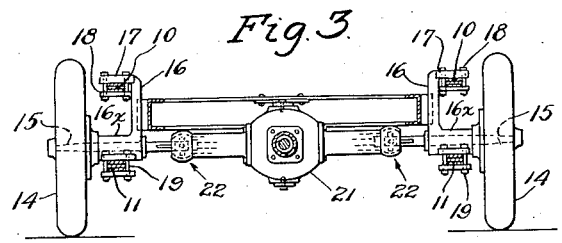
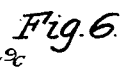
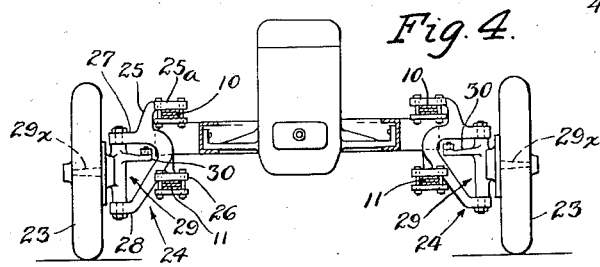
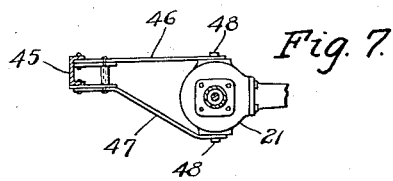
INVENTOR.
Arthur A. Goerz
BY Robt. D. Pearson
ATTORNEYS.

Patented Dec. 31, 1935

2,026,228

UNITED STATES PATENT OFFICE 2,026,228

SPRING CONSTRUCTION

Arthur A. Goerz, Los Angeles, Calif.

Application August 31, 1934, Serial No. 742,290

2 Claims. (Cl. 180—73)

This invention relates to an improved vehicle spring construction and to an improved mounting means for the spring elements of the device.

An object of the invention is to provide superior independent spring supports for each wheel of a vehicle in order that shock communicated to one wheel of the vehicle will not be directly transmitted to any of the other wheels; and if the shock is so severe as to injure one wheel assembly it will therefore not be apt to result in injury to any of the other wheel assemblies.

Another object of the invention is to provide a superior, more shock-resistant framework for connecting with the vehicle body the wheels, springs for the wheels and other parts of the running gear.

More specifically it is an object of the invention to provide improved means for mounting and coordinating the action of a plurality of spaced spring sets in their relation to a mounting means.

A still further object of the invention is to provide a less complicated and more satisfactory knee-action effect for the operation of the wheel assemblies of a vehicle.

Other objects, advantages and features of the invention may hereinafter appear.

Referring to the accompanying drawing, which illustrates what is at present deemed to be a preferred embodiment of the invention:

Fig. 1 is a plan view of the chassis and running gear of a vehicle provided with the invention.

Fig. 2 is a side elevation of the construction shown in Fig. 1.

Fig. 3 is a cross section taken on line 3—3 of Fig. 1.

Fig. 4 is a cross section on line 4—4 of Fig. 1.

Fig. 5 is a cross section on line 5—5 of Fig. 1.

Fig. 6 is a cross section on line 6—6 of Fig. 1.

Fig. 7 is a section on line 7—7 of Fig. 1.

In each section the arrows indicate the direction in which the parts are viewed, with parts removed.

Referring more particularly to Figs. 1 and 2 of the drawing, the side pieces 7 of the frame of the chassis are each provided with the upstanding rearmost hanger arm 8 which cooperates with another rear hanger arm 9, spaced forwardly thereof, to mount the upper spring assembly 10 at that side of the vehicle. A pair of pendant links 8a connect the spring at this point to the arm 8. Separate from the laminated leaf spring 10, and in a downwardly spaced relation therefrom is mounted the cooperating spring assembly or laminated spring 11, the rear end of which is connected to the chassis piece 7 by means of the hanger 12 and the pair of pendant links 12a, and the front end of which is suspended from the same chassis member 7 by means of a bearing member 13.

At each side of the vehicle the aforementioned chassis sustaining springs are connected in a novel manner with the rear vehicle wheels 14. For this purpose each wheel 14 is furnished with a stub-axle 15, which has mounted upon it an upwardly directed yoke-shaped bearing member 16. Said member 16 has an outwardly directed part 17 at its upper end which overlies the central part of the upper laminated spring 10 and is connected thereto by a clamping device 18. At its lower end said bearing member 16 has an outwardly directed arm 16x which receives the inner portion of the stub-axle 15 and forms a bearing therefor. Said arm 16x overlies the central portion of the lower laminated spring 11 and is fastened thereto by means of a clamping device 19.

The bearing members 8 and 12 may form part of a single bracket 8b (see Fig. 5) having a mounting extension 8c whereby it is bolted to the chassis. The bearing members 9 and 13 may likewise be parts of a bracket 9b (see Fig. 6) which is provided with an extension 9c whereby it is bolted to the chassis.

The rear wheels 14 are driven from a differential gearing within the differential casing 21, this drive being operatively connected with each of said wheels by means of an extensible universal joint construction 22.

With the front wheels 23 of the vehicle cooperate front springs substantially identical with those which have been described, and said front springs and their immediate connections are therefore lettered in the same manner. But instead of having stub-axles the front wheels are provided, as shown in Fig. 4, with hangers 24 each having an upper arm 25 having a lateral extension 25a connected with the spring 10, and a central lateral extension 26 connected with the spring 11. Each hanger 25 has outwardly directed spaced arms 27 and 28 between which is mounted a swivel member 29 having at one side a stub-axle 29x and at the opposite side a steering arm 30.

Near the front wheels 23, the lateral extensions 25a and 26 of each hanger 24 are directed inwardly, but near the rear wheels 14 the lateral extension 17 of the bearing member 16 is directed outwardly.

To each steering arm 30 is pivoted the front end of an operating link 31. To the opposite end of each link 31 is pivoted the crank arm 32 of the cross shaft 33 which is located a considerable distance rearward of the wheels 23. The cross-shaft 33, in turn, has fixed to it a radial operating arm 34 pivotally connected to the steering rod 35, the latter rod being operated by the upwardly extending arm 36. Said arm 36 is secured to shaft 37 and is in fixed relation to a worm gear 38 that meshes with the worm gear 39 mounted upon the lower end of the shaft 40 of the steering wheel 41.

A spring suspension means well shown in Fig. 7, is provided to support the differential gear case 21. Said gear case is supported from the rear chassis cross piece 45 by means of an upper leaf spring 46 and a cooperating lower leaf spring 47, which are bolted in place in any suitable manner. At their front ends each of said springs is connected to the gear case 21 by means of a sliding joint construction 48 which, while it does not interfere with supporting the gear case, nevertheless allows a slight front and rear movement thereof to accommodate it to the shocks and vibrations caused by inequalities in the road bed.

I claim:

1. In a vehicle construction, a chassis, a plurality of vehicle springs mounted upon said chassis in a vertically spaced relation to each other, a vehicle supporting wheel, a rotatable driven stub-axle supporting said wheel and fixedly connected thereto, and a bearing member for said axle having an upwardly directed arm, said arm having a lateral extension which is secured to one of said springs, and means at a lower level to secure said bearing member to the other of said springs.

2. In a vehicle construction, a chassis, a plurality of vehicle springs mounted upon said chassis in a vertically spaced relation to each other, a vehicle supporting wheel, a rotatable driven stub-axle supporting said wheel and fixedly connected thereto, and a bearing member for said axle having an upwardly directed arm, said arm having an outwardly directed lateral extension which is secured to one of said springs, and means at a lower level to secure said bearing member to the other of said springs.

ARTHUR A. GOERZ.